(12) United States Patent
Zhong et al.

(10) Patent No.: US 10,347,915 B2
(45) Date of Patent: Jul. 9, 2019

(54) MULTI-FUNCTIONAL BINDERS FOR FORMING INTEGRATED ELECTRODES

(71) Applicant: WASHINGTON STATE UNIVERSITY, Pullman, WA (US)

(72) Inventors: Weihong Zhong, Pullman, WA (US); Yu Wang, Pullman, WA (US)

(73) Assignee: Washington State University, Pullman, WA (US)

( * ) Notice: Subject to any disclaimer, the term of this patent is extended or adjusted under 35 U.S.C. 154(b) by 92 days.

(21) Appl. No.: 15/520,734

(22) PCT Filed: Oct. 30, 2015

(86) PCT No.: PCT/US2015/058234
§ 371 (c)(1),
(2) Date: Apr. 20, 2017

(87) PCT Pub. No.: WO2016/069995
PCT Pub. Date: May 6, 2016

(65) Prior Publication Data
US 2017/0317353 A1 Nov. 2, 2017

Related U.S. Application Data

(60) Provisional application No. 62/073,871, filed on Oct. 31, 2014.

(51) Int. Cl.
*H01M 10/0525* (2010.01)
*H01M 4/13* (2010.01)
(Continued)

(52) U.S. Cl.
CPC ............ *H01M 4/622* (2013.01); *H01G 11/38* (2013.01); *H01M 4/13* (2013.01); *H01M 4/139* (2013.01);
(Continued)

(58) Field of Classification Search
CPC ............ H01M 4/622; H01M 10/0565; H01M 10/0525; H01M 4/13; H01M 4/625; H01M 4/364; H01M 4/139; H01G 11/38
See application file for complete search history.

(56) References Cited

U.S. PATENT DOCUMENTS 6,010,653 A * 1/2000 Menon ................ B29C 41/16
156/308.6
2001/0023039 A1* 9/2001 Liu ..................... H01M 2/1653
429/217
(Continued)

OTHER PUBLICATIONS

International Preliminary Report on Patentability dated May 2, 2017, in International Application No. PCT/US15/58234, 6 pages.
(Continued)

*Primary Examiner* — Stewart A Fraser
(74) *Attorney, Agent, or Firm* — Liang IP, PLLC (57) ABSTRACT

Various embodiments of binder compositions, electrodes incorporating the binder compositions, fabrication methods for the binder compositions, and energy storage devices having the electrodes are disclosed herein. In one embodiment, a binder composition includes an electrolyte solution that is ionically conductive, a polymeric material having a plurality of molecules mixed with the electrolyte solution, and a filler having a plurality of electrically conductive particles suspended in the adhesive matrix. The electrolyte solution plasticizing the polymeric material forming an adhesive matrix having the molecules of the polymeric material in an amorphous state.

20 Claims, 12 Drawing Sheets

(51) Int. Cl.
    *H01M 4/36*     (2006.01)
    *H01M 4/62*     (2006.01)
    *H01M 4/139*     (2010.01)
    *H01G 11/38*     (2013.01)
    *H01M 10/0565*     (2010.01)
    *H01M 4/02*     (2006.01)
    *H01G 11/56*     (2013.01)

(52) U.S. Cl.
    CPC ........... *H01M 4/364* (2013.01); *H01M 4/625* (2013.01); *H01M 10/0525* (2013.01); *H01M 10/0565* (2013.01); *H01G 11/56* (2013.01); *H01M 4/623* (2013.01); *H01M 2004/021* (2013.01); *H01M 2300/0085* (2013.01); *Y02E 60/13* (2013.01)

(56) References Cited

U.S. PATENT DOCUMENTS

2002/0009636 A1*   1/2002   Endo ................... H01M 2/0212
                                            429/209
2004/0122178 A1*   6/2004   Huang ................. H01M 4/621
                                            525/221
2011/0003211 A1*   1/2011   Hudson ................. H01M 4/13
                                            429/304

OTHER PUBLICATIONS

International Search Report and Written Opinion dated Jan. 12, 2016, in International Application No. PCT/US15158234, 9 pages.

* cited by examiner

MULTI-FUNCTIONAL BINDERS FOR FORMING INTEGRATED ELECTRODES

CROSS-REFERENCE TO RELATED APPLICATION(S)

This application claims priority to U.S. Provisional Application No. 62/073,871, filed on Oct. 31, 2014.

BACKGROUND

Applications of lithium ion batteries and other types of energy storage devices (e.g., sodium ion batteries, supercapacitors etc.) have proliferated in recent years. For instance, many cars now are exclusively or partially powered by electrical motors coupled to lithium ion batteries. In addition, flexible energy storage devices are attracting attentions due to development of flexible/wearable electronics. For such applications, performance stability, device flexibility, and safety are desired attributes. The electrodes of such energy storage devices are a unique multi-component system which acts as a "warehouse" for the exchange between lithium ions and electrons.

DETAILED DESCRIPTION

Various embodiments of binder compositions, electrodes formed from such binder compositions, batteries or other energy storage devices incorporating the formed electrodes, and associated methods of manufacturing are described below. In the following description, specific details of components are included to provide a thorough understanding of certain embodiments of the disclosed technology. A person skilled in the relevant art will also understand that the disclosed technology may have additional embodiments or may be practiced without several of the details of the embodiments described below with reference to FIGS. 1A-13.

Performance stability, flexibility, and operational safety are desired attributes for energy storage devices, such as lithium or sodium ion batteries. These properties are believed to be results of intrinsic properties and structures of components and interfaces among different components. Efforts have been spent on developing nanostructured electrodes for high-performances. However, it has been recognized that interfacial issues can result in fading of cycle retention, gaps between theoretical and practical capacity, and rapid deterioration under deformations.

Conventional binder materials for forming electrodes typically have good adhesion and electric conductivity properties. Such binder materials can be used to form porous structures of electrodes resulted from a random stacking of the binder material and electrode particles. However, defects and/or voids inside such porous structures can cause performance degradation. Several embodiments of the disclosed technology are directed to compliant, electrically and ionically conductive structures suitable as electrodes. Such structures can be formed using a binder composition as described in more detail below.

Figure 1A:
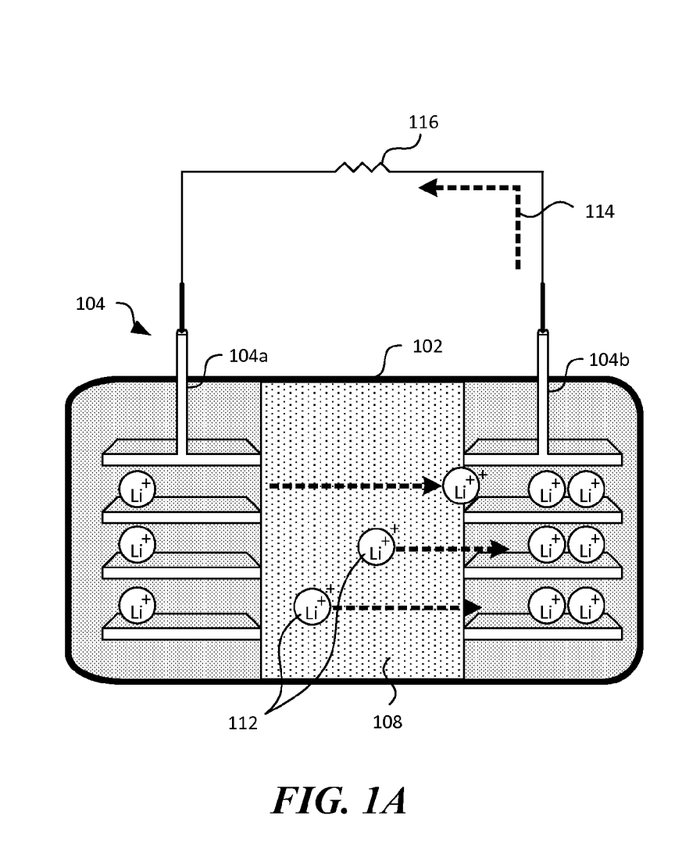
FIGS. 1A-1B are schematic diagrams of an energy storage device during various operating modes in accordance with embodiments of the disclosed technology.
Figure 1B:
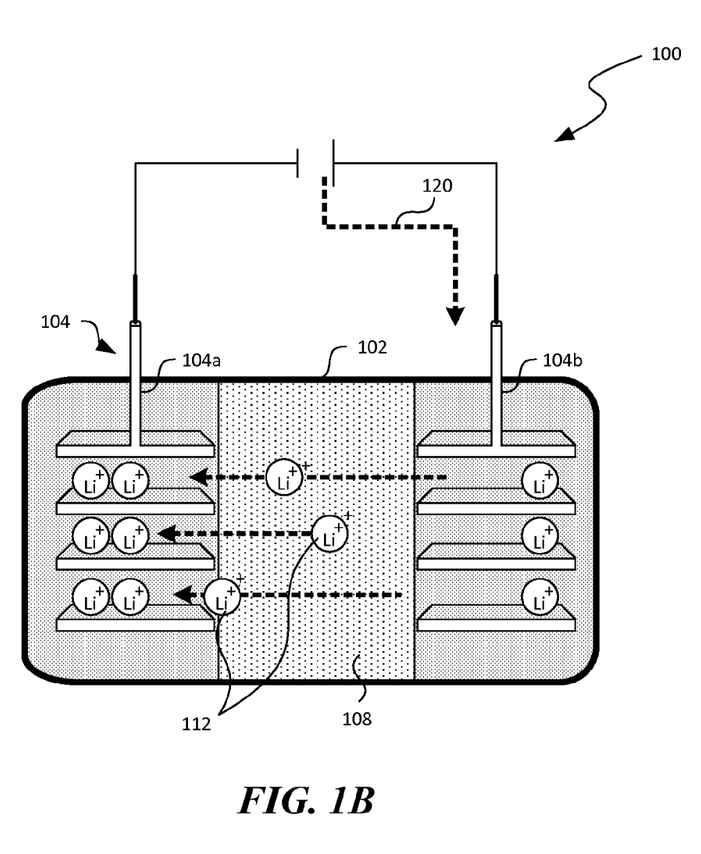

FIGS. 1A-1B are schematic diagrams of an energy storage device during various operating modes in accordance with embodiments of the present technology. For illustration purposes, the energy storage device is described below using a lithium-ion battery 100 as an example. FIG. 1A shows the lithium-ion battery 100 during discharging. FIG. 1B shows the lithium-ion battery 100 during charging. In other embodiments, the energy storage device can be other types of battery and supercapacitors containing, for instance, sodium, potassium, calcium, magnesium, cadmium, or copper ions. The energy storage device can also contain a chemical sensor, an organic thin film transistor, an electromechanical actuator, a polymer light emitting diode, a gas separation membrane, a fuel cell, and/or other suitable components.

As shown in FIGS. 1A and 1B, the lithium-ion battery 100 can include a housing 102 holding a first electrode 104a, a second electrode 104b, and an electrolyte 108 between the first and second electrodes 104a and 104b. The first and second electrodes 104a and 104b are collectively referred to as electrodes 104. The lithium-ion battery 100 can also include salts such as $LiPF_6$, $LiAsF_6$, $LiClO_4$, $LiBF_4$, and lithium triflate contained in, for example, the electrolyte 108. In certain embodiments, the electrolyte 108 can include a non-liquid electrolyte having, for instance, a polymer electrolyte with suitable additives. In other embodiments, the electrolyte 108 can include other suitable types of electrolyte. Even though particular components are illustrated in FIGS. 1A and 1B, in other embodiments, the lithium-ion battery 100 can also include insulators, gaskets, vent holes, and/or other suitable components (not shown).

In certain embodiments, the first electrode 104a can include a carbonaceous material (e.g., graphite), Lithium metal (Li), Sodium metal (Na), Aluminum metal (Al), Magnesium metal (Mg), Silicon (Si), tin (Sn), zinc (Zn), lead (Pb), antimony (Sb), bismuth (Bi), silver (Ag), gold (Au), and/or other element electrodeposited on and alloy with lithium (Li) and or sodium (Na), Aluminum (Al), Magnesium (Mg), Silicon (Si), tin (Sn). In other embodiments, the first electrode 104a can also include a binary, ternary, or higher order mixtures of the elements that can be electrodeposited on and alloy with lithium (Li) or sodium (Na), Aluminum (Al), Magnesium (Mg), Silicon (Si), tin (Sn). Examples of binary mixtures include Sn—Zn, Sn—Au, Sn—Sb, Sn—Pb, Zn—Ag, Sb—Ag, Au—Sb, Sb—Zn, Zn—Bi, and Zn—Au. Examples of ternary mixtures include Sn—Zn—Sb, Sn—Zn—Bi, Sn—Zn—Ag, Sn—Sb—Bi, Sb—Zn—Ag, Sb—Zn—Au, and Sb—Sn—Bi. An example of a quaternary mixture can include Sn—Zn—Sb—Bi. In yet another embodiments, the first electrode 104a can also include intermetallic compounds of elements (e.g., the generally pure elements discussed above) and other elements that can be electrodeposited and alloy with lithium (Li) or sodium (Na). Examples of such intermetallic compounds include Sn—Cu, Sn—Co, Sn—Fe, Sn—Ni, Sn—Mn, Sn—In, Sb—In, Sb—Co, Sb—Ni, Sb—Cu, Zn—Co, Zn—Cu, and Zn—Ni.

In certain embodiments, the second electrode 104b can include a layered oxide (e.g., lithium cobalt oxide ($LiCoO_2$)), a polyanion (e.g., lithium iron phosphate ($LiFePO_4$)), Sulfur and its composites with carbonaceous material, or a spinel (e.g., lithium manganese oxide ($LiMn_2O_4$)). Other suitable materials for the second electrode 104b can include lithium nickel oxide ($LiNiO_2$), lithium iron phosphate fluoride ($Li_2FePO_4F$), lithium cobalt nickel manganese oxide ($LiCo_{1/3}Ni_{1/3}Mn_{1/3}O_2$), Li ($Li_aN_{i_x}Mn_yCo_z)O_2$, and/or other suitable cathode materials. As discussed in more detail below with reference to FIGS. 2 and 3, the first and second electrodes 104a and 104b can be formed using a binder composition to bind the foregoing compositions suitable for the first and/or second electrodes 104a and 104b. The formed first and second electrodes 104a and 104b can be compliant and with high electrical and ionic conductivities.

As shown in FIG. 1A, during discharging, lithium ions 112 are extracted from the first electrode 104a and migrate toward the second electrode 104b via the electrolyte 108. The lithium ions 112 pass through the electrolyte 108 and are inserted into the second electrode 104b. As a result, a current 114 flows from the second electrode 104b past a load 116 to the first electrode 104a. As shown in FIG. 1B, during charging, a charger 118 provides a charging current 120 to the second electrode 104b. The charging current 120 causes lithium ions 112 to be extracted from the second electrode 104b and move toward the first electrode 104a.

Figure 2:
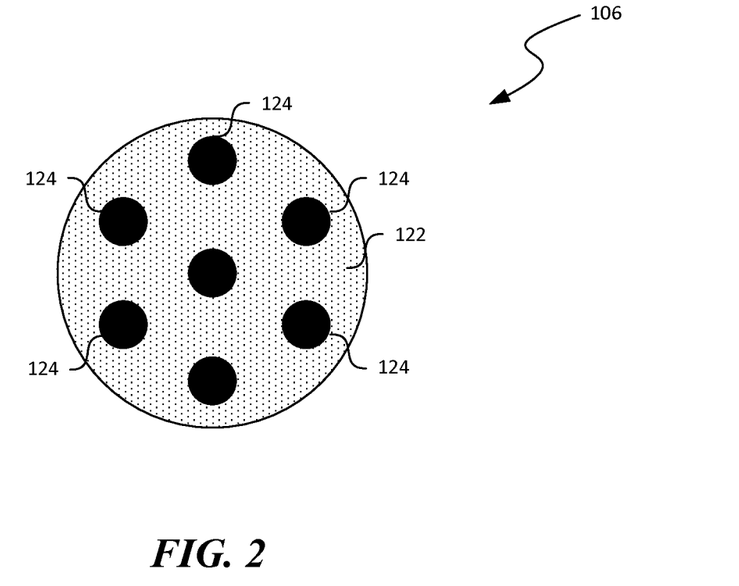
FIG. 2 is a schematic diagram illustrating a structure suitable for the electrodes of the lithium ion battery in FIGS. 1A and 1B in accordance with embodiments of the disclosed technology.

FIG. 2 is a schematic diagram illustrating a structure 106 suitable for the electrodes 104 of the lithium ion battery 100 in FIGS. 1A and 1B in accordance with embodiments of the disclosed technology. As shown in FIG. 2, the structure 106 can include a binder composition 122 that binds a plurality of electrode particles 124 into a generally non-porous structure. In certain embodiments, the binder composition 122 can include an electrolyte solution mixed with a polymer material. For instance, the electrolyte solution can include a solution of lithium perchlorate ($LiClO_4$) in propylene carbonate or a solution of lithium perchlorate ($LiClO_4$) in ionic liquids, or other suitable solvents. The polymer material can include poly(ethylene oxide) and/or poly(vinylidene fluoride), poly(vinyl alcohol), polyacrylonitrile, poly(methyl methacrylate) having a molecular weight of about $5 \times 10^6$ g/mol or other suitable molecular weights. The electrolyte solution can plasticize the polymer material into a gum-like adhesive matrix. The electrolyte solution can have a loading at 10%, 20%, 30%, 40%, 50%, 60%, 70%, 80%, 90% or other suitable percentage by weight. In other embodiments, the binder composition 122 can also include a filler that is electrically conductive. For example, the filler can include a plurality of carbon-based particles, metal nanoparticles/nanowires, or other suitable conductive particles suspended in the plasticized adhesive matrix. In further embodiments, the binder composition can also include an emulsifier/surfactant, a viscosity modifier, or other suitable components. An example binder composition 122 is discussed in more detail below with reference to FIG. 3.

Electrode particles 124 can include the compositions as discussed above with reference to FIGS. 1A and 1B or any other suitable compositions. For example, in certain embodiments, the electrode particles 124 can include electrically non-conductive particles such as silicon (Si) or sulfur (S). In such embodiments, the binder material can include the filler as discussed above. In other embodiments, the electrode particles 124 can include conductive particle such as metal or metal alloy particles. In such embodiments, the filler may be omitted in the binder composition. Alternatively, the binder composition can also include the filler to, for instance, further enhance electrical conductivity of the structure 106.

Figure 3:
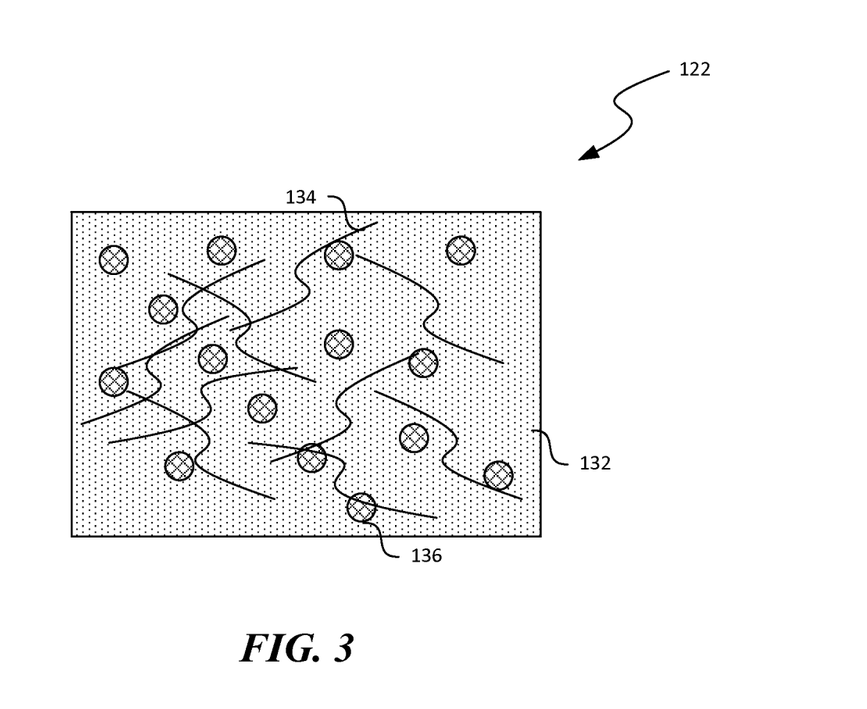
FIG. 3 is a schematic diagram illustrating an example binder composition suitable for the structure in FIG. 2 in accordance with embodiments of the disclosed technology.

FIG. 3 is a schematic diagram illustrating an example binder composition 122 suitable for the structure 106 in FIG. 2 in accordance with embodiments of the disclosed technology. In certain embodiments, the electrolyte solution 132 can include a solution of $LiPF_6$, $LiAsF_6$, $LiClO_4$, $LiBF_4$, or lithium triflate in organic solvents (e.g., propylene carbonate, ethylene carbonate, ethyl-methyl carbonate), ionic liquids (e.g., 1-Ethyl-3-Methylimidazolium Tetrafluoroborate), water, or other suitable solvent. In other embodiments, the electrolyte solution 132 can also include a solution of $Na_2FePO_4F$, $Li_2FePO_4F$, or other suitable compositions in a suitable solvent. In one embodiment, the polymer material 134 can include poly(ethylene oxide). In other embodiments, the polymer material 134 can include polyurethane, poly(acrylic acid), poly(vinylidene fluoride), poly(vinyl alcohol), polyacrylonitrile, poly(methyl methacrylate), polydiallyldimethylammonium chloride, carboxymethyl cellulose, styrene-butadiene rubber, or other suitable adhesive materials. The filler particles 136 can include a plurality of electrically conductive particles such as carbon, metallic, or other suitable types of particles.

As shown in FIG. 3, the binder composition 122 can include an electrolyte solution 132, a polymer material 134, and a plurality of filler particles 136. The electrolyte solution 132 can plasticize the polymer material 134 into an adhesive matrix that suspends the filler particles 136 therein. In the illustrated embodiment, the polymer material 134 can include a plurality of long chain polymer molecules in an amorphous state. In other embodiments, the polymer material 134 can also include a plurality of other suitable polymer molecules in semi-amorphous or other suitable states.

Conventional electrodes typically include a random stacking of a binder material and electrode particles to form a porous structure that is mechanically fragile and unstable. Such porous structures can have weak adhesion between the electrode particles and other components (e.g., polymer binder, conductive fillers, and current collectors), non-uniform electrical conductivity, and a lack of ionic conductivity. Several embodiments of the binder composition 122 and the structure 106 in FIG. 2 can have stable and conductive interfaces between, for example, the electrode particles 124 (FIG. 2) and the filler particles 136. The binder composition 122 and the structure 106 can also have high ionic and electrical conductivities, for example, an electrical conductivity of greater than about $10^{-2}$ S/cm and an ionic conductivity of greater than about $10^{-3}$ S/cm at room temperature. The binder composition 122 and the structure 106 can also be compliant and flexible, for instance, by having an elastic modulus of greater than about 1 MPa to about 2.5 MPa.

Figure 4A:
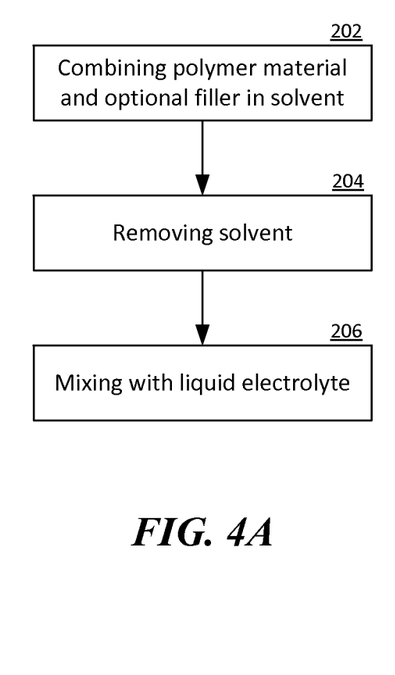
FIGS. 4A, 4B and 4C are flowcharts showing methods of manufacturing the binding composition of FIG. 3 in accordance with embodiments of the disclosed technology.
Figure 4B:
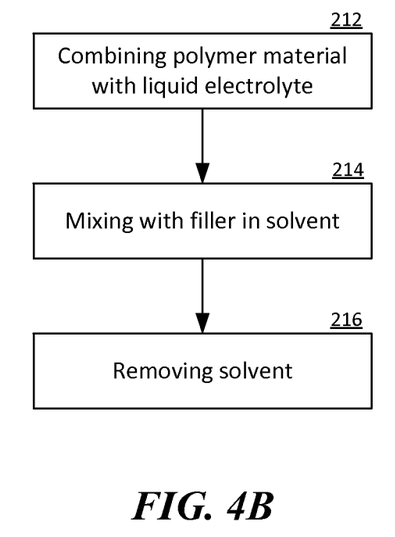
Figure 4C:
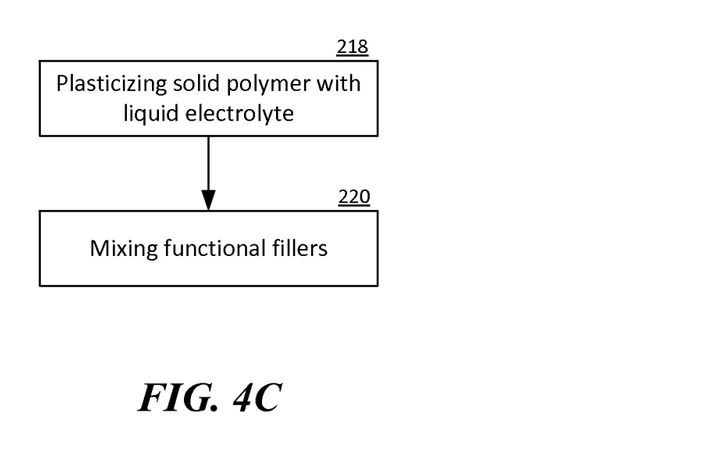

FIGS. 4A-4C are flowcharts showing processes of manufacturing the binding composition of FIG. 3 in accordance with embodiments of the disclosed technology. As shown in FIG. 4A, the process can include combining a polymer material and an optional filler in a solvent to form a generally homogenous slurry at stage 202. In one embodiment, the polymer material and the optional filler can be combined using high speed mixing to obtain the generally homogeneous slurry. In other embodiments, the polymer material and the optional filler can be combined in other suitable manners. The process can then include removing the solvent in the slurry at stage 204 by, for example, heating and/or vacuuming to evaporate the solvent to obtain a dried material. The process can further include mixing the obtained dried material with a desired electrolyte solution at stage 206 to form the example binder composition. As shown in FIG. 4B, the process can include combining the polymer material and the electrolyte solution at stage 212 to derive an adhesive matrix. The process can then include mixing the filler in the solvent with the adhesive matrix at stage 214. The process further includes removing the solvent at stage 216 to derive the example binder composition.

As shown in FIG. 4C, the process can include plasticizing a solid polymer material with an electrolyte solution at stage 218 to derive a generally homogeneous adhesive matrix using high speed mixing, mechanical blending by extrusion, torque mixing, or other suitable techniques. The process can then include mixing the optional filler 136 (FIG. 3) with the adhesive matrix at stage 220 to derive the example binder composition. The mixing of the adhesive matrix with the filler 136 can be processed by using high speed mixing, mechanical blending by extrusion, or torque mixing to obtain the generally homogeneous binder compositions.

Figure 5A:
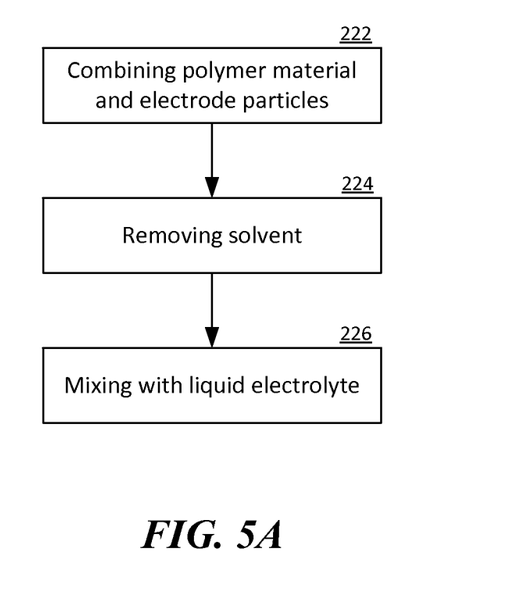
FIGS. 5A, 5B and 5C are flowcharts showing methods of manufacturing the non-porous structure of FIG. 2 in accordance with embodiments of the disclosed technology.
Figure 5B:
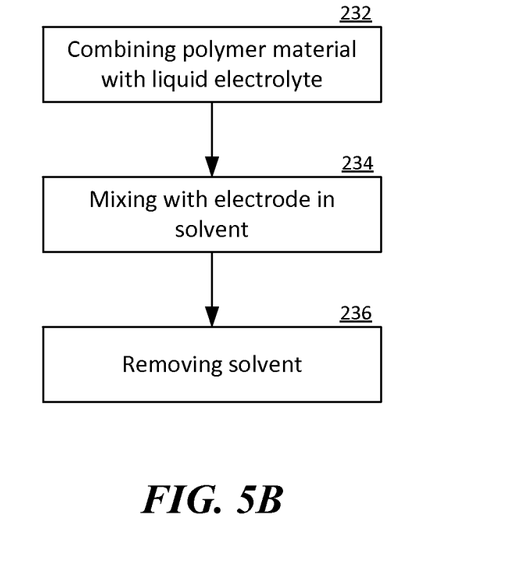
Figure 5C:
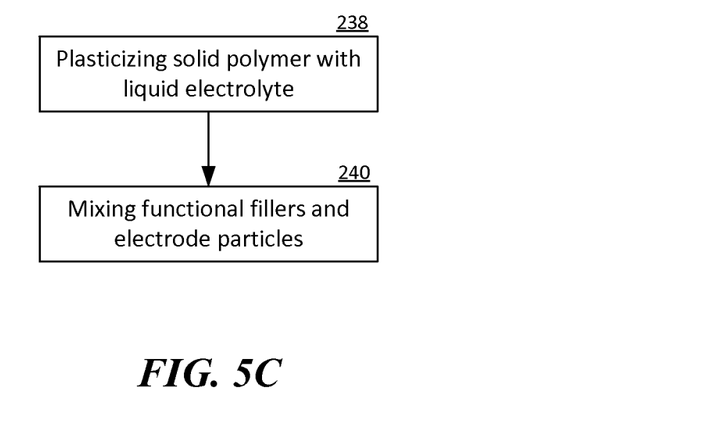

FIGS. 5A-5C are flowcharts showing methods of manufacturing the non-porous structure of FIG. 2 in accordance with embodiments of the disclosed technology. The processes shown in FIGS. 5A and 5B can be generally similar to those in FIGS. 4A, 4B and 4C except electrode particles are added together with the fillers. As such, operations 222, 224, and 226 of FIG. 5A can be generally similar to operations 202, 204, and 206 of FIG. 4A. Operations 232, 234, and 236 of FIG. 5B can be generally similar to operations 212, 214, and 216 of FIG. 4B. Operations 238 AND 240 of FIG. 5C can be generally similar to operations 218 AND 220 of FIG. 4C. However, in certain embodiments, the processes shown in FIGS. 5A and 5B can also include combining the polymer material with the electrode particles and a filler having a plurality of electrically conductive particles, as discussed above with reference to FIGS. 2 and 3.

As shown in FIG. 5C, another process can include combining the solid polymer material and the electrolyte solution at stage 238 to derive a generally homogeneous adhesive matrix using high speed mixing, mechanical blending by extrusion, torque mixing, or other suitable techniques. The process can then include mixing the optional filler and electrode particles with the adhesive matrix at stage 214 to derive the example electrode 106 (FIG. 1A). The mixing of the adhesive matrix with filler 136 (FIG. 3) and electrode particles 124 (FIG. 2) can be processed by using high speed mixing, mechanical blending by extrusion or torque mixing to obtain the generally homogeneous electrodes 106.

Experiments

Experiments were conducted in forming example binder compositions (referred to hereafter as DCA) and integrated electrodes using such binder compositions as discussed in more detail below. These experiments showed that the formed binder compositions and integrated electrodes can have significantly improved mechanical properties, ionic conductivities, electrical conductivities than conventional binder compositions and electrode structures. The general procedures for preparing DCA samples and integrated electrodes based on DCA can be generally similar to the methods shown in FIGS. 4A-4C and FIGS. 5A-5C, respectively.

Figure 6:
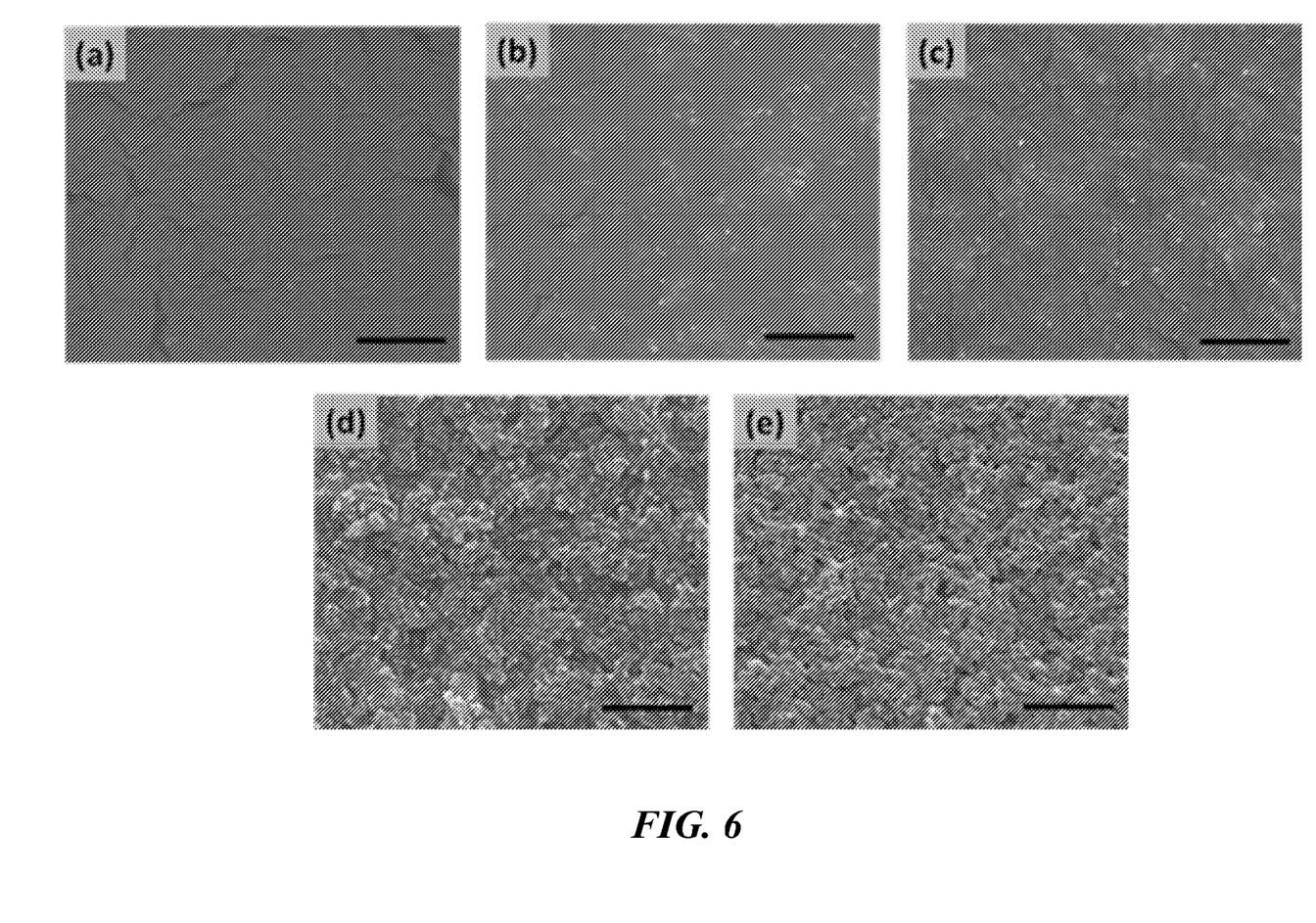
FIG. 6 shows scanning electron microscopy ("SEM") images of free surfaces of an example binder composition with different loading of conductive fillers at (a) 6 wt %, (b) 10 wt %, (c) 15 wt %, (d) 20 wt % and (e) 25 wt % in accordance with embodiments of the disclosed technology.

In one experiment, a binder composition having a highly concentrated polymer electrolyte solution was produced. The solution includes ultra-high molecular weight poly (ethylene oxide) (UHMWPEO, Mw=$5 \times 10^6$ g/mol) in a liquid electrolyte (LiClO$_4$ in propylene carbonate (PC)). The concentrated polymer electrolyte solution shows significant gum-like behavior and is referred to hereafter as a gummy matrix). Loading of liquid electrolyte in the gummy matrix (1 mol/L, LiClO$_4$ in PC) was about 60 wt %, which resulted in an ionic conductivity of $3 \times 10^{-3}$ S/cm. Conductive fillers (e.g., carbon black) was introduced into the gummy matrix. Adjusting loading of the conductive carbon black (CB) in the gummy matrix from about 6 wt % to about 25 wt % resulted in significantly variation in structure and properties. FIG. 6 shows how free surface of DCA changed with increasing loading of CB. SEM images in FIG. 6 shows that the DCA lost structural integrity/continuity and amount of defects/voids can be observed when the CB loading is above about 15 wt %.

Figure 7:
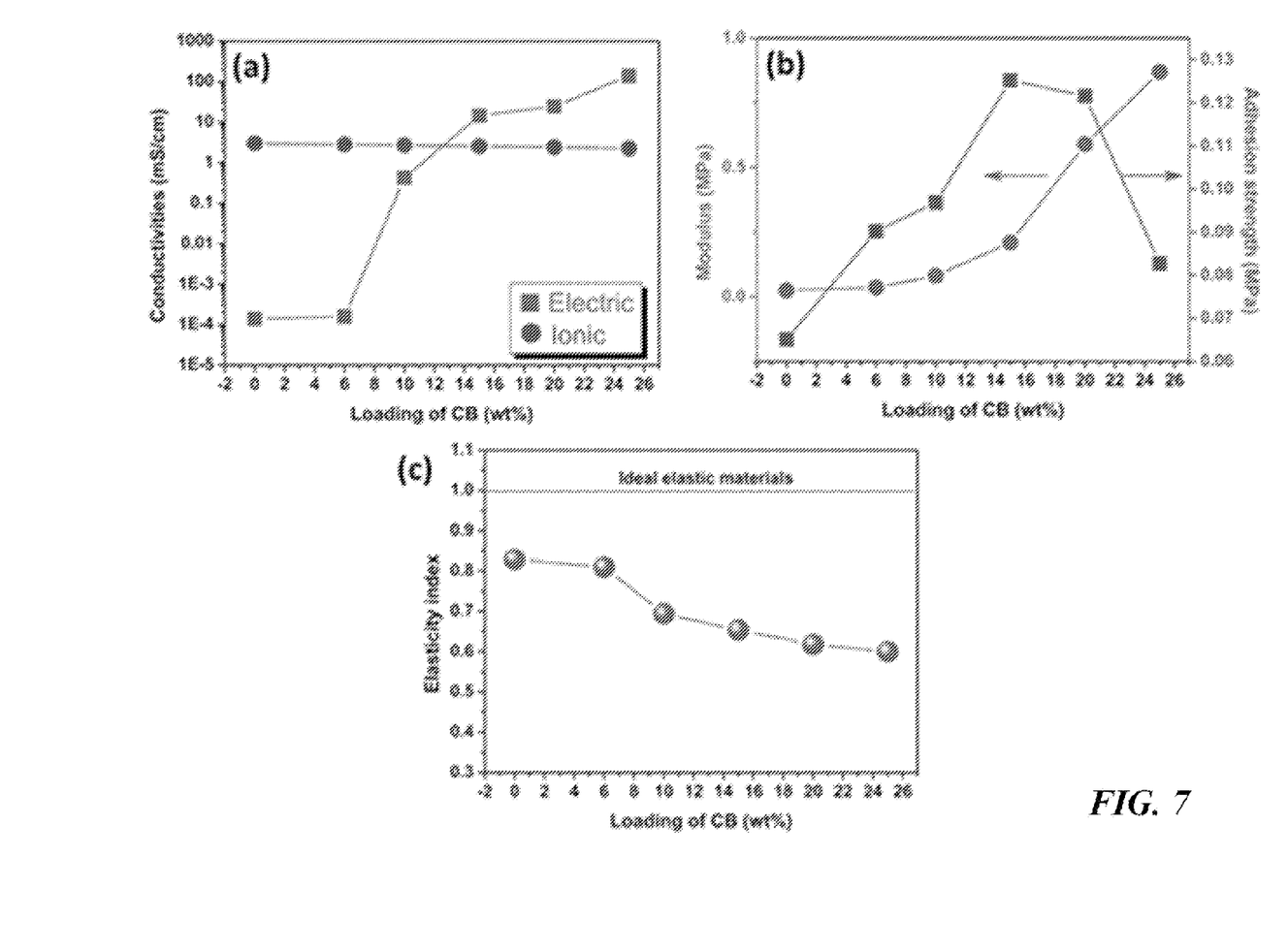
FIG. 7 shows (a) electric and ionic conductivities, (b) modulus and adhesion strength, and (c) elasticity index of an example binder composition with different loading of conductive fillers in accordance with embodiments of the disclosed technology.

The CB-loading dependent behaviors of the properties, including adhesion strength, electric and ionic conductivities, modulus as well as elasticity, of the sample DCA are shown in FIG. 7. As shown in FIG. 7, electrical conductivity, adhesion strength and modulus are more sensitive to the CB loading. Based on surface morphology, a CB loading of about 15 wt % appeared to have the highest adhesion strength. An even higher loading of CB would decrease adhesion strength remarkably, which is believed to be a result of discontinuity of surface structures as shown in FIGS. 3 (d) and (e).

The addition of CB can affect ionic conductivity of the DCA in different ways. For example, the addition of CB can decrease the ionic conductivity by lowering a fraction of gummy matrix for ionic conduction, or can increase the ionic conductivity by providing special pathways for ion transportation (for example, forming liquid layer on the surface). However, a high ionic conductivity can be maintained as long as CB filler is a minor component (e.g. <about 20%). Ionic conductivity shown in FIG. 7 is obtained by calculation from mixing rules, which only consider the negative contribution from the addition of CB, i.e. the mechanism on providing pathways for ion transportation is not within the consideration in the calculated results. Moreover, mechanical properties is another important property for matrix binder materials. Elastic materials are preferred as it may be used to fabricate elastic electrodes. As shown in FIG. 7 (c), the elasticity index (defined as the ratio of the recoverable strain to the initial strain) of DCA decreases with the increasing of CB loading, indicating that the elastic properties are dominated by the gummy matrix. For the DCA with 15 wt % of CB, the elasticity index is about 0.7, implying good elastic properties. Also, ideal elastic material with an elasticity index of 1 is indicated for reference.

Figure 8:
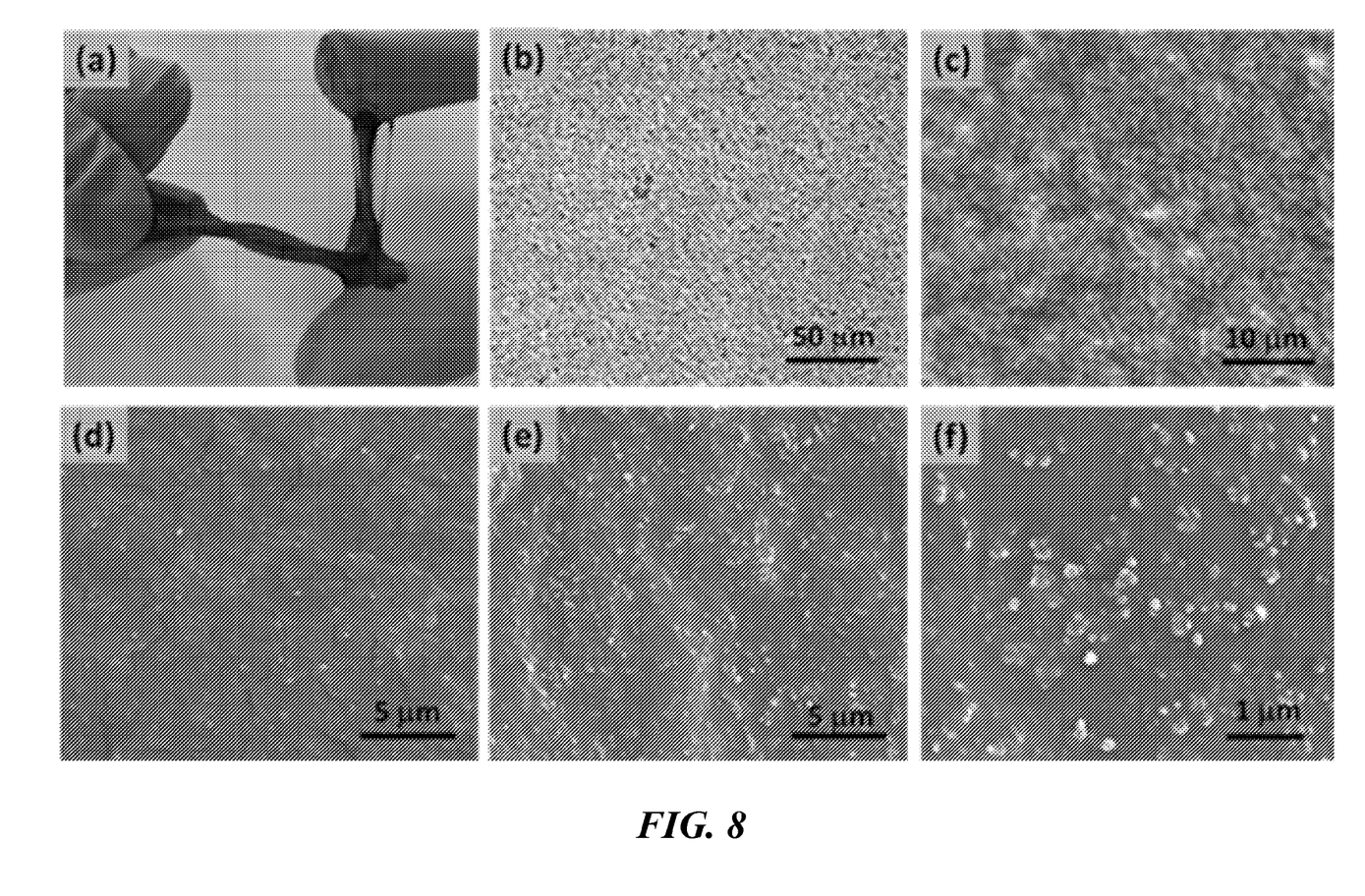
FIG. 8 shows (a) digital photo of conformability and adhesion properties, (b) and (c): optical images with different magnifications; (d) SEM image of a free surface; (e) and (f): SEM images of fracture surface with different magnifications of an example binder material with 15 wt % of conductive filler in accordance with embodiments of the disclosed technology.

Based on the above results, DCA with 15 wt % of CB (referred to as DCA-15% hereafter) showed a good combination of adhesion strength, electronic and ionic conductivities, elasticity, and modulus. The structures of DCA-15% were further studied and the results are shown in FIG. 8. The digital photo clearly demonstrates the conformability as well as strong adhesion properties of DCA-15%. From the optical images, one can observe homogeneous distribution and good dispersion of CB fillers inside. SEM images not only further confirm the good dispersion, but also imply a good interfacial interaction between the CB fillers and the gummy matrix as there is no separation between the two components.

Figure 9:
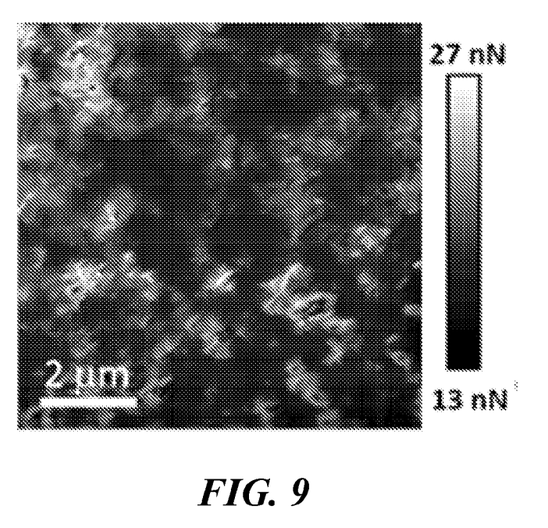
FIG. 9 shows an adhesive force mapping of an example binder composition in accordance with embodiments of the disclosed technology.
Figure 10:
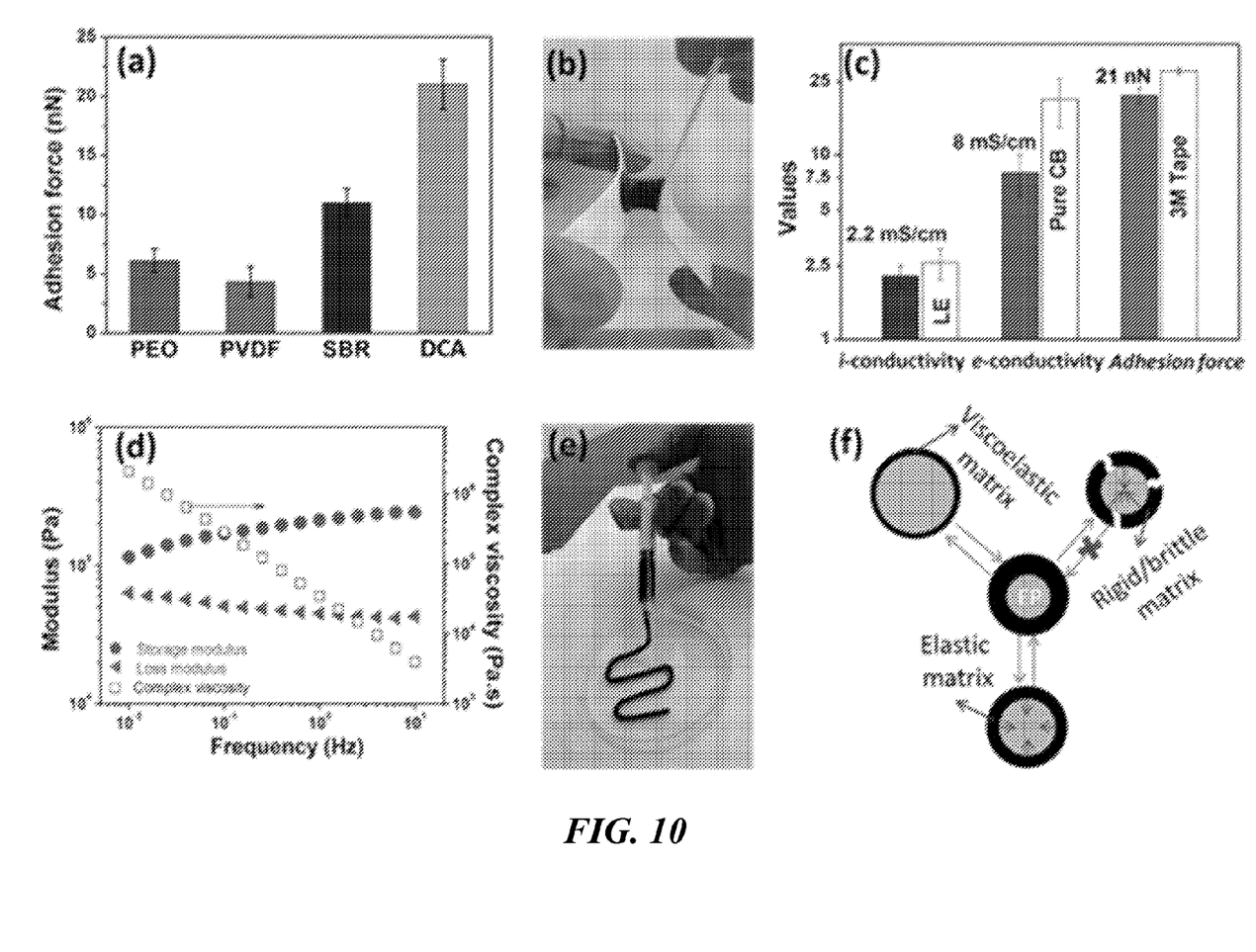
FIG. 10 shows (a) comparison of adhesion force of an example binder composition with traditional binder materials; (b) digital photo demonstrating adhesion properties; (c) properties of the example binder composition and comparison with select counterparts; (d) rheological properties of the example binder composition showing the storage, loss moduli and the shear-thinning behavior; (e) demonstration of rheological properties of the example binder composition for extrusion; (f) schematic of mechanical/rheological properties for electrode matrix materials.

Systematic studies on properties of the DCA-15% samples were also conducted. FIG. 9 shows mapping of adhesion force determined by peak force quantitative nanomechanical (PFQNM) characterization via AFM. The adhesion force varied from about 13 nN to about 27 nN, which is significantly higher than that of the conventional binder materials, including pure PEO, poly(vinylidene fluoride) (PVDF) and styrene-butadiene rubber (SBR), as shown in FIG. 10(a). Two polyethylene-based plates with bending modulus of about 0.6 GPa were used as shown in FIG. 10(b). The notable flexural behavior of the plastic plate indicates strong adhesion force at the interfaces. It is believed that high adhesion can also promote high conformability to the rigid electrode particles as further discussed later.

Certain properties of the DCA-15% samples are summarized and compared with selected counterparts in FIG. 10(c). The average adhesion force of the DCA-15% samples was found to be about 21±2 nN. The ionic conductivity was found to be about 2.2 mS/cm, was estimated by mixing rule: $\sigma = \sigma_0 \varphi$, where $\sigma_0$ and $\varphi$ are the ionic conductivity and volume fraction of the adhesive matrix, respectively, with $\sigma_0 = 2.4$ mS/cm, $\varphi = 0.9$. The average electrical conductivity of the DCA-15% samples (8 mS/cm) was found to be at similar level as pure CB (20 mS/cm).

FIG. 10(d) shows that DCA is a typical viscoelastic material showing mechanical/rheological properties desirable for mechanical conformability as well as good processability. The moduli of DCA-15% samples (about 0.2 MPa at 1 Hz) indicated that DCA is a soft and conformable material. As demonstrated in FIG. 10(e), the DCA-15% samples can be easily dispensed from a manual syringe, and thus can be processed by extrusion or other high throughput manufacturing techniques. The mechanical/rheological properties of an electrode matrix for interface performance is illustrated in FIG. 10(f). As shown in FIG. 10(f), a conformable adhesive matrix (e.g., DCA) with appropriate mechanical/rheological properties can conform to deformed electrode particles without failing and can act as a "buffer" to absorb the volume change and relax the stress quickly. In contrast, a rigid electrode matrix with high modulus and/or brittleness can easily form cracks and, at the same time, raise a high resistance to the volume change of electrode particles to impede electrochemical processes (e.g., lithiation). Lastly, high elasticity of the electrode matrix will help to build up stress with deformation, which may become a resistance force to volume change or peeling to separate the adhesive matrix from the electrode particles.

Figure 11:
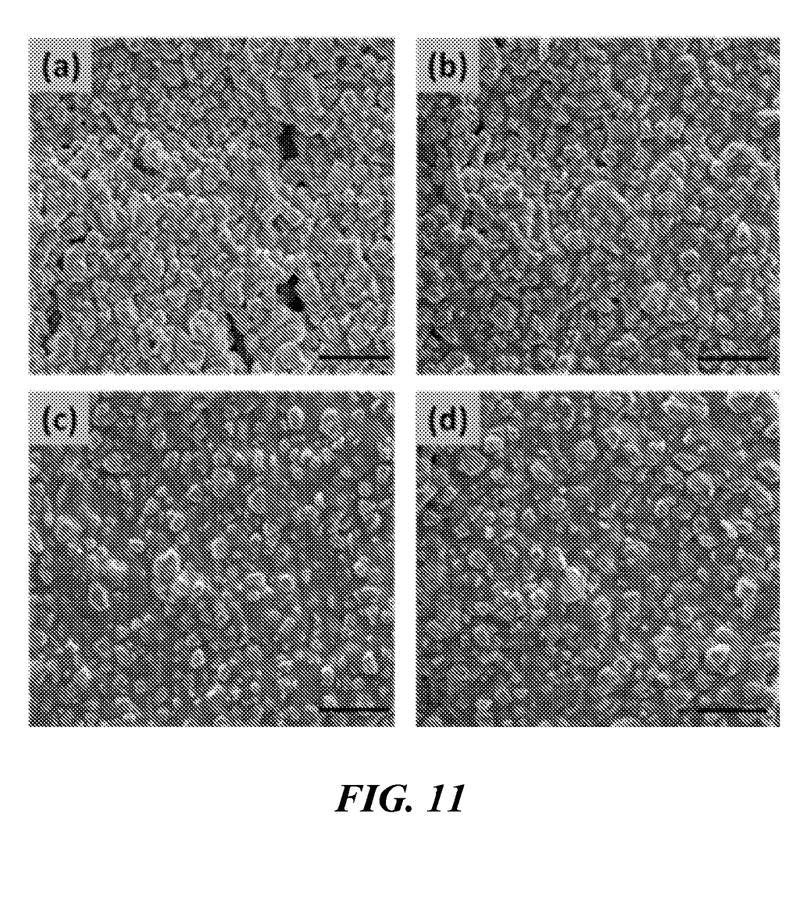
FIG. 11 shows SEM images of a fracture surface of example electrodes with (a) 20 wt %, (b) 25 wt %, (c) 30 wt %, and (d) 35 wt % loading of a binder composition in accordance with embodiments of the disclosed technology.

In additional experiments, DCA-15% was employed as a matrix (referred to hereafter as matrix binder) for non-conductive electrode particles. For conductive electrode particles, such as lithium/sodium powder, graphite, carbon nanotubes, etc., conductive fillers in DCA can be replaced by conductive electrode particles, as demonstrated below using graphite. FIG. 11 shows impact of loading of the matrix binder on obtained structures of the electrodes. For the electrodes with a loading of DCA-15% less than about 30 wt %, there are some voids and defects inside the electrodes. For the electrodes with DCA-15% loading above about 30 wt %, very few defects/voids were observed on the SEM images. However, a high loading of binder composition may not be in favor of a high energy density. Therefore, the loading of DCA-15% for integrated electrodes should be evaluated individually for each type of electrode and from many aspects, including the micro-structures, the mechanical properties and the device performances.

Figure 12:
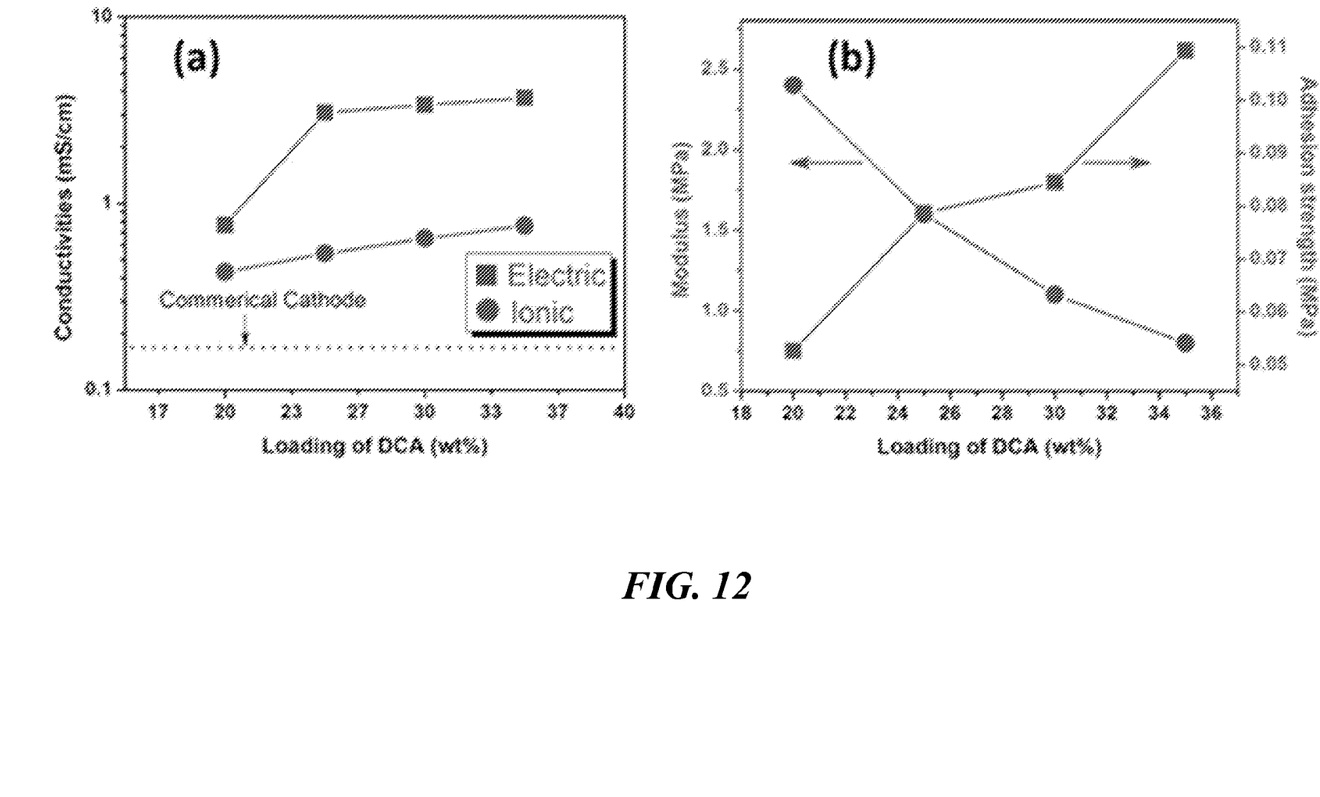
FIG. 12 shows (a) electric and ionic conductivities and (b) modulus and adhesion strength of example electrodes with different loading of an example binder material in accordance with embodiments of the disclosed technology.
Figure 13:
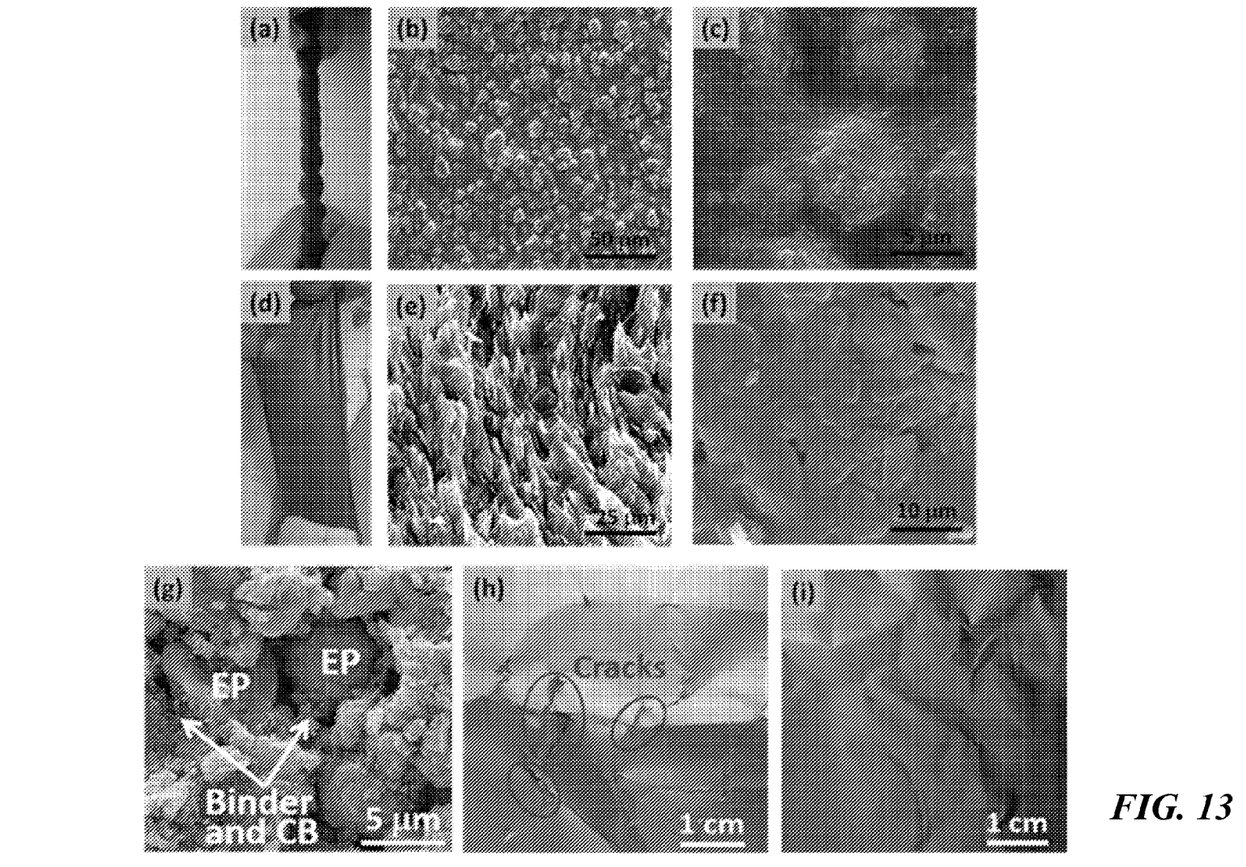
FIG. 13 shows (a) a digital photo showing conformability, (b) a SEM image of a fracture surface and, (c) a SEM image of free surface of an example cathode, (d) a digital photo showing conformability/stretchability, (e) a SEM image of a fracture surface, and (f) a SEM image of a free surface of an example anode in accordance with embodiments of the disclosed technology.

As shown in FIG. 12(a), the electrodes formed with DCA-15% showed much better electrical conductivity than commercial cathode. At the same time, these electrodes also possess good mechanical (e.g., modulus>about 1 MPa) and adhesion properties (≈0.1 MPa) as shown in FIG. 12(b). FIG. 13 shows conformability/stretchability and the structures of the conformable integrated electrodes with a loading of matrix binder of about 30 wt %. As shown in FIGS. 13(a) and 13(d), the electrodes can be deformed by twisting or stretching without breaking, indicating good conformability and structural integrity. The SEM images further confirm integrated electrode structures without or with few voids/defects between electrode particles as shown in fracture surface in FIGS. 13(b) and 13(e). A strong interaction between the matrix binder and electrode particles is also indicated by the free surface shown in FIGS. 13(c) and 13(f), which lead to a generally homogeneous coating of binder composition on electrode surfaces. In contrast, a conventional cathode with a porous structure have many cracks between binder/CB and electrode particles as seen in FIG. 13(g). The difference in structural integrity is further demonstrated via comparing the conventional cathode in FIG. 13(h) with the integrated electrode in FIG. 13(i) after wrinkling. As shown in these images, the conventional cathode was broken or detached from the current collector, while the integrated electrode based on DCA maintained structural integrity even after wrinkling.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. An electrode for an energy storage or electronic device, comprising:
a binder composition having:
an electrolyte solution, the electrolyte solution being ionically conductive; and
a polymeric material mixed with the electrolyte solution, the electrolyte solution plasticizing the polymeric material forming an adhesive matrix; and
a plurality of electrode particles mixed with the binder composition, wherein the adhesive matrix of the binder composition binds the plurality of electrode particles together forming a non-porous structure.

2. The electrode of claim 1 wherein the formed non-porous structure is compliant, electrically conductive, and ionically conductive.

3. The electrode of claim 1 wherein the binder composition further includes a plurality of electrically conductive particles suspended in the adhesive matrix.

4. The electrode of claim 1 wherein the formed non-porous structure has:
an elastic modulus of greater than about 1 MPa to about 2.5 MPa;
an electrical conductivity of greater than about $10-2$ S/cm; and
an ionic conductivity of greater than about $10-3$ S/cm.

5. The electrode of claim 1 wherein the polymeric material includes a plurality of polymeric molecules having a molecular weight of about $1 \times 105$ g/mol to about $10 \times 106$ g/mol.

6. The electrode of claim 1 wherein the polymeric material includes a plurality of polymeric molecules having a molecular weight of about $1 \times 105$ g/mol to about $10 \times 106$ g/mol, and wherein the polymeric molecules are plasticized by the ionically conductive electrolyte solution in an amorphous state.

7. The electrode of claim 1 wherein:
the plurality of electrode particles are electrically non-conductive; and
the binder composition further includes a filler having a plurality of electrically conductive particles suspended in the adhesive matrix.

8. The electrode of claim 1 wherein:
the plurality of electrode particles are electrically conductive; and
the binder composition does not include additional electrically conductive particles other than the electrode particles suspended in the adhesive matrix.

9. A battery, comprising:
a first electrode;
a second electrode spaced apart from the first electrode; and
a non-liquid electrolyte between the first and second electrodes; wherein the first or second electrode includes:
a binder composition having an ionically conductive electrolyte solution and a polymeric material mixed with the electrolyte solution, the electrolyte solution plasticizing the polymeric material forming an adhesive matrix; and
a plurality of electrode particles mixed with the binder composition, wherein the adhesive matrix of the binder composition binds the plurality of electrode particles together forming a non-porous structure.

10. The battery of claim 9 wherein at least one of the first or second electrode is compliant, electrically conductive, and ionically conductive.

11. The battery of claim 9 wherein the binder composition further includes a plurality of electrically conductive particles suspended in the adhesive matrix.

12. The battery of claim 9 wherein at least one of the first or second electrode has:
an elastic modulus of greater than about 1 MPa to about 2.5 Pa;
an electrical conductivity of greater than about $10-2$ S/cm; and
an ionic conductivity of greater than about $10-3$ S/cm.

13. The battery of claim 9 wherein the polymeric material includes a plurality of polymeric molecules having a molecular weight of about $1 \times 105$ g/mol to about $10 \times 106$ g/mol.

14. The battery of claim 9 wherein the polymeric material includes a plurality of polymeric molecules having a molecular weight of about $1 \times 105$ g/mol to about $10 \times 106$ g/mol, and wherein the polymeric molecules are plasticized by the ionically conductive electrolyte solution in an amorphous state.

15. The battery of claim 9 wherein:
the plurality of electrode particles are electrically non-conductive; and
the binder composition further includes a filler having a plurality of electrically conductive particles suspended in the adhesive matrix.

16. The battery of claim 9 wherein:
the plurality of electrode particles are electrically conductive; and
the binder composition does not include additional electrically conductive particles other than the electrode particles suspended in the adhesive matrix.

17. A binder composition, comprising:
an electrolyte solution, the electrolyte solution being ionically conductive;
a polymeric material having a plurality of molecules mixed with the electrolyte solution, the electrolyte solution plasticizing the polymeric material forming an adhesive matrix having the molecules of the polymeric material in an amorphous state; and
a filler having a plurality of electrically conductive particles suspended in the adhesive matrix.

18. The binder composition of claim 17 wherein the ionically conductive electrolyte solution includes a solution of a salt in an organic solvent, an ionic liquid, and/or water.

19. The binder composition of claim 17 wherein the ionically conductive electrolyte solution includes a solution of a salt in an organic solvent, an ionic liquid, and/or water, and wherein the polymeric material includes at least one of poly(ethylene oxide), poly(vinylidene fluoride), poly(vinyl alcohol), polyacrylonitrile, or poly(methyl methacrylate) having a molecular weight of about $1 \times 105$ g/mol to about $10 \times 106$ g/mol.

20. The binder composition of claim 17 wherein the ionically conductive electrolyte solution includes a solution of a salt in an organic solvent, an ionic liquid, and/or water, and wherein the polymeric material includes at least one of poly(ethylene oxide), poly(vinylidene fluoride), poly(vinyl alcohol), polyacrylonitrile, or poly(methyl methacrylate) having a molecular weight of about $1 \times 105$ g/mol to about 10×10⁶ g/mol, and further wherein the electrolyte solution has a loading of about 1 wt % to about 99 wt % in the adhesive matrix.

* * * * *